United States Patent
Guo et al.

(10) Patent No.: US 10,324,688 B2
(45) Date of Patent: *Jun. 18, 2019

(54) SYSTEM AND METHOD FOR A FLOATING-POINT FORMAT FOR DIGITAL SIGNAL PROCESSORS

(71) Applicant: Futurewei Technologies, Inc., Plano, TX (US)

(72) Inventors: Yuanbin Guo, Mira Loma, CA (US); Tong Sun, Allen, TX (US); Weizhong Chen, Austin, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,924

(22) Filed: Oct. 3, 2017

(65) Prior Publication Data

US 2018/0046435 A1    Feb. 15, 2018

Related U.S. Application Data

(63) Continuation of application No. 13/452,701, filed on Apr. 20, 2012, now Pat. No. 9,792,087.

(51) Int. Cl.
    *G06F 7/483*    (2006.01)
(52) U.S. Cl.
    CPC .................... *G06F 7/483* (2013.01)
(58) Field of Classification Search
    CPC ... G06F 7/483; G06F 7/49915; G06F 7/49921
    See application file for complete search history.

(56) References Cited

U.S. PATENT DOCUMENTS

| | | | |
|---|---|---|---|
| 4,589,067 A | 5/1986 | Porter et al. | |
| 4,700,319 A | 10/1987 | Steiner | |
| 4,744,045 A | 5/1988 | Mills et al. | |

(Continued)

FOREIGN PATENT DOCUMENTS

| | | |
|---|---|---|
| CN | 101847087 A | 9/2010 |
| CN | 102135870 A | 7/2011 |
| JP | 2006318382 A | 11/2006 |

OTHER PUBLICATIONS

Fang, Fang, et al., "Lightweight Floating-Point Arithmetic: Case Study of Inverse Discrete Cosine Transform," Eurasip Journal on Advances in Signal Processing, vol. 2002, No. 9, Jan. 1, 2002, 14 pages.

(Continued)

*Primary Examiner* — Chuong D Ngo
(74) *Attorney, Agent, or Firm* — Slater Matsil, LLP

(57) ABSTRACT

An embodiment of a system and method for performing a numerical operation on input data in a hybrid floating-point format includes representing input data as a sign bit, exponent bits, and mantissa bits. The exponent bits are represented as an unsigned integer including an exponent bias, and a signed numerical value of zero is represented as a first reserved combination of the mantissa bits and the exponent bits. Each of all other combinations of the mantissa bits and the exponent bits represents a real finite non-zero number. The mantissa bits are operated on with a "one" bit before a radix point for the all other combinations of the mantissa bits and the exponent bits.

28 Claims, 4 Drawing Sheets

(56) References Cited

U.S. PATENT DOCUMENTS

| | | | |
|---|---|---|---|
| 5,359,548 | A | 10/1994 | Yoshizawa et al. |
| 5,602,769 | A | 2/1997 | Yu et al. |
| 5,619,198 | A | 4/1997 | Blackham et al. |
| 5,646,876 | A | 7/1997 | Smith |
| 6,205,462 | B1 | 3/2001 | Wyland et al. |
| 6,996,596 | B1 | 2/2006 | Ho et al. |
| 8,106,914 | B2 | 1/2012 | Oberman et al. |
| 9,792,087 | B2 * | 10/2017 | Guo .................... G06F 7/483 |
| 2005/0091299 | A1 | 4/2005 | Ko et al. |
| 2007/0078923 | A1 | 4/2007 | Dockser |
| 2009/0037504 | A1 | 2/2009 | Hussain |
| 2012/0059866 | A1 | 3/2012 | Conyngham et al. |

OTHER PUBLICATIONS

Goldberg, D., "What Every Computer Scientist Should Know About Floating-Point Arithmetic," edited reprint of the paper "What Every Computer Scientist Should Know About Floating-Point Arithmetic,", by David Goldberg, published in the Mar. 1991 issue of Computing Surveys, 1991, Association for Computing Machinery, Inc., pp. 171-264.

Kerr, Douglas, "Scientific Notation and Floating Point Representation," Issue 1, Jul. 20, 2011, 20 pages.

Mackenzie, Donald, "Knowing Machines—Essays on Technical Change," Negotiating Arithmetic, Constructing Proof, Jan. 1, 1996, 14 pages.

MSP430 Family, "Floating Point Formats," 1998, pp. G1-G6.

Scott, Thomas J. "Computer Arithmetic," Encyclopedia of Computer Science, Jan. 1, 2003, 10 pages.

Suzuki, H., et al., "Leading-Zero Anticipatory Logic for High-Speed Floating Point Addition," IEEE Journal of Solid-State Circuits, Aug. 1996, pp. 1157-1164, vol. 31, No. 8, IEEE.

"Fixed-Point Arithmetic," Wikipedia, printed on Mar. 17, 2013, 5 pages.

"IEEE Floating Point," Wikipedia, printed on Mar. 17, 2013, 9 pages.

"VAX 11 780 Architecture Handbook—Chapter 4," vol. 1, Jan. 1, 1977, 14 pages.

Corden, Martyn J. et al., "Consistency of Floating-Point Results using the Intel Compiler or Why doesn't my application always give the same answer?," Software Solutions Group Intel Corporation, Jan. 1, 2009, 16 pages.

Daly, Raymond E. et al., "The Book—Accessing the TRS-80 ROM," vol. I: MATH, Infinity Graphix, Jan. 1, 980, 14 pages.

Eldon, John, "A 22-BIT Floating Point Registered Arithmetic Logic Unit," International Conference on Acoustics, Speech & Signal Processing, Apr. 1, 1983, 4 pages.

"Pdp 11/40 processor handbook—7.3 Floating Point Option," digital equipment corporation, Retrieved from the Internet: url:pdox.csail.mit.edu/6.828/2005/readings/pdp11-40.pdf, Jan. 1, 1972, 6 pages.

\* cited by examiner

US 10,324,688 B2

SYSTEM AND METHOD FOR A FLOATING-POINT FORMAT FOR DIGITAL SIGNAL PROCESSORS

CROSS-REFERENCE TO RELATED APPLICATIONS

This application is a continuation of U.S. patent application Ser. No. 13/452,701, filed on Apr. 20, 2012, which application is hereby incorporated herein by reference.

TECHNICAL FIELD

The present invention relates generally to a system and method for digital computation, and more particularly to a system and method for operating a computing platform such as a digital signal processor or a hardware accelerator with an optimized floating-point format.

BACKGROUND

Adders, multipliers, etc., are logical elements that perform basic and extended digital numerical operations in digital processors such as microprocessors, digital signal processors ("DSPs"), arithmetic logic units ("ALUs"), hardware accelerators (HACs), etc. Extended operations include square root, division, etc., which can require substantial numerical processing, inherently increase their complexity. The overall performance of digital processors is generally dependent on the speed and energy efficiency of its constituent logical elements.

The design of adders, multipliers, etc., is heavily dependent on the format representation of the numbers on which they operate. The cost of microprocessors, DSPs, etc., is substantially proportional to the silicon area required to implement the logical elements from which they are formed. An important consideration in providing a competitive design for an end product is improvement in speed required for execution of numerical operations. The floating-point representation of numbers employed therein can have a substantial impact on the speed of numerical operations and the silicon area required for an implementation.

Thus, what is needed in the art is a floating-point number representation that avoids numerical processing inefficiencies encountered in present implementations. The ability to improve the performance and reduce the silicon area required to implement DSPs, HACs, etc., without incurring unnecessary cost would answer an important market need.

SUMMARY

These and other problems are generally solved or circumvented, and technical advantages are generally achieved, by embodiments of the present invention which provides a system, apparatus, and method for performing a numerical operation on input data in a hybrid floating-point format includes representing input data as a sign bit, exponent bits, and mantissa bits. The exponent bits are represented as an unsigned integer including an exponent bias, and a signed numerical value of zero is represented as a first reserved combination of the mantissa bits and the exponent bits. Each of all other combinations of the mantissa bits and the exponent bits represents a real finite non-zero number. The mantissa bits are operated on with a presumed hidden "one" bit before a radix point for the all other combinations of the mantissa bits and the exponent bits.

In an embodiment, all the mantissa bits and all the exponent bits are set to zero in the first reserved combination of the mantissa bits and the exponent bits. In an embodiment, the mantissa bits and the exponent bits are set to a maximum finite value when the exponent bits produced by the numerical operation are computed to be greater than all the exponent bits set to one.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
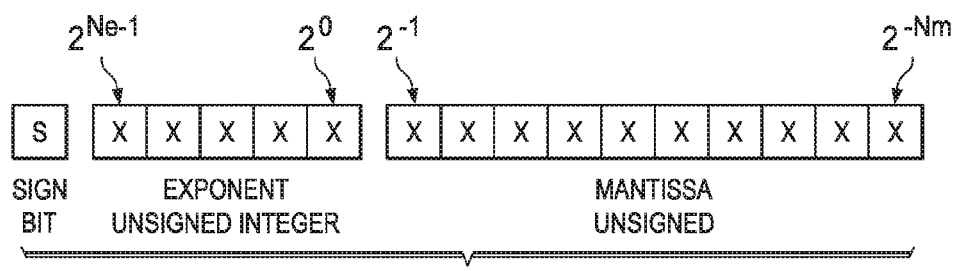
FIG. 1 illustrates a graphical representation of a hybrid floating point number, in accordance with an embodiment.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In numerical computation, a number can be represented in either a fixed-point or a floating point number representation. The number of bits can be assigned based on performance requirements. On the other hand, the assigned word length directly impacts the speed of executing numerical operations and silicon costs in terms of gate counts, power consumption, etc. The actual hardware cost depends on the implementation architecture of the arithmetic units given the word length and format for representing numerical data.

A fixed-point number representation has been used for the baseband modem chip design used in wireless cellular networks, such as Long-Term Evolution ("LTE"), Universal Mobile Telephone System ("UMTS"), Global System for Mobile Communications ("GSM") and other wireless and wired communication systems. This is true for both Hardware ACceleration ("HAC") circuits in which the baseband algorithms are implemented in hardwired silicon circuits with little flexibility, and for DSP processors which allow software programmability. Current commercial DSP cores dedicated for baseband signal use a fixed-point arithmetic to achieve a necessary level of performance such as latency. Conventional floating-point number formats are generally too complex for efficient baseband signal processing and thus would introduce more gates and power consumption.

Particularly due to the application of MIMO detection algorithms in LTE and UMTS (called "MIMO factor"), the dynamic range of numbers in these wireless systems is huge. This poses substantial challenges in designing a fixed-point system with reasonable word length and gate counts.

Fixed-point number representations have other drawbacks. One is the need for dynamic range scaling to find the best range for a set of numbers within a DSP algorithm, which involves tremendous shifting and saturation operations before the actual arithmetical operations. This reduces the real-time performance of DSP software or the HAC.

Another drawback is the lengthy and tedious process to identify the fixed-point algorithm specification, including error-pruning. Typically, a huge document with numerous heterogeneous word-length parameters for each variable is generated by algorithm designers for the DSP software programmers. The process of drafting specifications is time-consuming and significantly increases time-to-market for an end product.

A further drawback is high power consumption for a silicon implementation of DSP and HAC circuits due to the need for large bit widths for some variables in advanced DSP algorithms, especially for MIMO detection.

A half-precision or variable hybrid floating-point number format as introduced herein for wireless and other applications combined with many customizations which are suitable for wireless signal processing algorithms can produce a number of benefits. These include lower power consumption in the DSP, increased DSP software performance in terms of speed of execution and cycle count, and streamlined design flow from algorithm to chip design.

Customizations to a floating-point number format and numerical operations are described to achieve improved performance in several critical design areas, including hardware micro-architecture design of the DSP cores and HAC circuits, DSP software programming requirements, the handling of exceptions and special numbers by the compiler, and simplified exceptions leading to less probability of errors in verification and validation. These customizations are based on characteristics of the signal processing algorithms of the wireless communication systems and other real-time systems to provide sufficient representation of the real numbers in these systems, while maintaining performance metrics. These customizations play a key role in optimizing the critical path, timing closure, and overall power consumption of the DSP processor micro-architecture, simplifying the DSP software programming and related design flow, and increasing the DSP software efficiency in cycle count. Thus, the total cost of the baseband system on a chip ("SoC") and the base station is reduced.

A floating-point number representation for data processed by a real-time DSP or other digital processor is inherently more complex than a fixed-point representation for implementation of an algorithm. This difference is due in part to complexity differences of a single-precision vs. a double-precision numerical representation. An example of a double-precision representation is specified in IEEE Standard for Floating-Point Arithmetic 754-2008, August 2008, for floating-point numbers, which is hereby incorporated herein by reference.

DSPs are generally implemented to perform high-speed, repetitive, numerical calculations in wireless baseband systems as well as in wired communication systems. When the word length of numbers is long and there is no optimization in handling numerical exceptions resulting from the number format, the DSP processing microarchitecture is configured to accommodate complex numerical exceptions, making the processing microarchitecture more complex than one operating on a fixed-point number representation. The result is longer latencies and higher gate counts associated with DSP computations, which encumber performance of end systems such as wireless baseband systems. The multi-input/multi-output ("MIMO") factor in wireless communication demands a much higher dynamic range and rapid execution of numerical operations than other signal processing algorithms. This poses further challenges for a low power SoC design, especially for a DSP or a HAC.

An apparatus and method are introduced to represent real numbers as hybrid floating-point numbers in a computing platform, including but not limited to devices such as a central processing unit ("CPU"), DSP, field programmable gate array ("FPGA"), application-specific integrated circuit ("ASIC"), or a software program written in a higher-level programming language such as C or C++. In general, the numerical processes introduced herein can be applied to a general numerical computing platform.

The hybrid floating-point number format employed in an embodiment is configured to provide sufficient performance for DSP algorithms while keeping the processing micro-architecture as simple as possible. The physical implications of real numbers that represent real-time signals are utilized to avoid the use of special numbers such as an NaN ("not a number," such as o/o or the square root of −1), denormalized numbers, i.e., numbers with mantissas that do not start with "1" and have a limiting negative exponent, which can result from subtracting two very small numbers or by dividing a very small number by a very large number, infinity, etc. The handling of these exceptions, as introduced herein, is simplified. For example, "divide by zero" is protected by setting the result to a maximum absolute numerical value and overflow is protected by clipping the exponent to the maximum absolute value. Denormalized numbers are simply underflowed and flushed to zero according to the sign bit, or set to a signed minimum number.

A shorter floating-point word length can provide a larger dynamic range than a fixed-point implementation of baseband signal processing of a baseband DSP system, both in a DSP core and a HAC. A shorter word length also simplifies exception handling, and is important for achieving superior performance in both power consumption and software cycle count for an extended numerical operation.

A hybrid floating-point number format different from standard floating-point formats such as described in IEEE Standard for Floating-Point Arithmetic 754-2008, August 2008, is introduced that is suitable for wireless signal processing and other high-speed operations with special features such as special positive and negative representations of the numerical value "0," and a variable length hybrid floating-point format including floating-point 16 and 28-bit floating-point number formats, etc., with precision selectable by a software instruction such as an add or multiply instruction. The new floating-point number format includes special handlings in calculations associated with the floating-point number formats, such as rounding and handling of special values, etc.

The hybrid floating-point number formats are directed, without limitation, to baseband processing of wireless communication systems. They can also be used in engineering systems including wired communication systems, networks, mobile devices, control systems, etc., that can benefit from a floating-point implementation.

A hybrid floating-point number can be represented in the format illustrated in FIG. 1. As illustrated in FIG. 1, a hybrid floating point number in conformance with the principles introduced herein includes three components: a sign bit S, exponent bits $N_e$, and mantissa bits $N_m$. A real number x is represented in the floating point format as $$x = s2^{\left(\sum_{j=0}^{N_e} n_j s^j - N_b\right)} \times \left(1 + \sum_{k=1}^{M} m_k 2^{-k}\right) \quad \text{Equation (1)}$$

where (S, $N_e$, $N_b$, $N_m$) are parameters to specify the floating-point format representation. The sign bit is $S \varepsilon \{0,1\}$, where S=1 signifies a positive number. The number of bits of the exponent part is $N_e$, and the number of bits of the mantissa part is $N_m$.

The mantissa and exponent values bear the following characteristics: The exponent bits are a non-negative unsigned integer. To represent both negative and positive exponent values, unlike IEEE Standard for Floating-Point Arithmetic 754-2008, an odd or an even bias is used for a given number of exponent bits, for example, the odd bias $N_B = 2^{N_e - 1} - 1$, or an even bias without subtraction of "1" from a power of 2. An even bias extends the range of represented numbers toward larger numbers, and omits representation of the smallest numbers that would otherwise be represented with an odd bias. Such a biased representation can be advantageous for physical signals. For example, in the IEEE Standard for Floating-Point Arithmetic 754-2008, single precision (32-bits) has the number of exponent bits $N_e = 8$ and the odd bias $N_b = 127$. For double precision (64-bits), the number of exponent bits is $N_e = 11$ and the odd bias is $N_b = 1023$.

The numerical value "exp" of the exponent bits is $$\exp = \sum_{n=0}^{N_e - 1} \text{bit}_n^{exp} \times 2^n - \text{bias}$$

where $\text{bit}^{exp}_n$ is the $n^{th}$ exponent bit.

The mantissa, also known as the significand, represents the precision bits. It is composed of a hidden leading bit 1 and fraction bits stored in the $N_m$ mantissa bits. An exception is the mantissa for the numerical value "zero." For this case if all the mantissa and exponent bits are zero, the special number "zero," which is signed, is indicated. Thus, the floating-point format introduced herein is a hybrid floating-point format because it assigns a special bit configuration for the number zero.

The special number "0" is not directly representable in the format by equation (1). Both "+0" and "−0" are supported and are treated as equals.

Mantissa $\varepsilon[1,2)$ is the value of the mantissa and is represented by the mantissa bits as $$\text{Mantissa} = 1 + \sum_{m=0}^{N_m - 1} \text{bit}_m^{mantissa} \times 2^{-(m+1)}$$

where m is the mantissa bit index and $$\text{bit}^{mantissa}_m$$

is the $m^{th}$ mantissa bit.

The range of numbers that can be represented with the format (S, $N_e$, $N_m$) is $$2^{-bias}(1 + 2^{-N_m}) \leq |x| \leq 2^{bias+2}(1 - 2^{-(N_m+1)})$$

plus the signed numerical value "zero" as described further hereinbelow.

To deal with some special numbers, exponents of all 0s and all 1s are reserved for some special numbers. No special number is reserved to signal failure of a computation. For the smallest absolute non-zero numerical value, it is assumed that only the least significant bit ("LSB") of the mantissa bits is 1 and all the other more significant bits are 0s, with the exception of the hidden bit. The sign bit can assume either value. For the largest absolute value, it is assumed that all mantissa and exponent bits are is, except the sign bit which can assume either value.

Some corner cases are necessary to control overflow and underflow. Overflow means that the value is too large for the range of the floating-point representation. Both negative overflow $$(x < -2^{bias}(2 - 2^{-N_m}))$$

and positive overflow $$(x > 2^{bias}(2 - 2^{-N_m}))$$

are possible results of a computation. When overflow happens, the maximum value can be given to the number. Thus, overflow is handled with saturation to a maximum absolute value.

To accommodate overflow, all the mantissa bits can be set to one and all the exponent bits can be set to one when the exponent bits produced by a numerical operation are computed to be greater than all the exponent bits set to one. It is assumed that the event to generate infinity such as "divide-by-zero" are controlled by the data range. In IEEE Standard for Floating-Point Arithmetic 754-2008, August 2008, the values +infinity and −infinity are denoted with an exponent of all 1s and a fraction of all 0s.

Underflow can be a less serious problem for an application because it often just denotes a loss of precision. A reserved combination of the mantissa bits and the exponent bits, such as all the mantissa bits and all the exponent bit set to zero, can be employed for the minimum absolute value to avoid a "divide-by-zero" error, which occurs when the exponent of a variable would become less than zero, i.e., out of the range of a normal exponent.

Special handling in the calculation associated with the hybrid floating point formats includes rounding toward 0 regardless of the sign bit, which is equivalent to truncation of the least significant mantissa bit(s).

Figure 2:
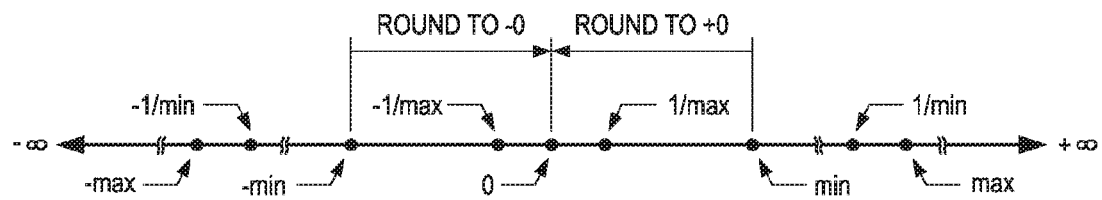
FIG. 2 illustrates a graphical representation of real numbers from minus infinity to plus infinity, in accordance with an embodiment.

Turning now to FIG. 2, illustrated is a graphical representation of real numbers from minus infinity to plus infinity, in accordance with an embodiment. The real number zero is represented in the middle of the line, which can have a signed value. The two signed values are treated as equals. In an embodiment, the value of zero is represented by a special/reserved combination of mantissa bits and exponent bits. For example, the special/reserved combination of mantissa bits and exponent bits can be all the mantissa bits and all the exponent bits set to zero.

The minimum absolute value of the mantissa bits and exponent bits is illustrated in FIG. 2 by the value "min," which is shown on the line of real numbers with positive and negative values, "−min" and "+min." During computation, any computed value that falls between −min and +min is rounded to −0 or +0 according to the sign of the computed value. The value produced for −0 or +0 is the signed special/reserved combination of mantissa bits and exponent bits that represent zero.

The maximum absolute value of the mantissa bits and exponent bits is illustrated in FIG. 2 by the value "max," which is shown on the line of real numbers as positive and negative values, "−max" and "+max." The signed maximum absolute values can fall on either side of the reciprocal of the respective signed minimum absolute value, which can be determined by the value of the bias of the exponent bits. A special/reserved value for plus or minus infinity is not used. In an embodiment, the mantissa bits and the exponent bits are sent to a maximum signed finite value when the exponent bits produced by the numerical operation are computed to be greater than all the exponent bits set to one. Accordingly, an exponent overflow produces a signed maximum finite absolute value for the hybrid floating-point number. The maximum finite absolute value can be represented, for example, by all exponent bits and all mantissa bits set to 1.

Compared with a fixed-point implementation of baseband algorithms, the half-precision floating-point implementation introduced herein offers a number of benefits with several optional alterations. Half-precision generally refers to a binary floating-point number format that occupies 2 bytes (i.e., 16-bits).

A hybrid fixed-point and floating-point number format in which special values, such as values for +zero and −zero, are selectively assigned can combine the floating-point system with some features of a fixed-point system to represent a real physical signal in a communication system in the several aspects.

In scientific computing, a value for infinity needs to be defined for very large numbers. It can be useful for general purpose floating-point computation as it allows operations to continue after an overflow event. However, infinity is not a physically realizable signal amplitude. In IEEE Standard for Floating-Point Arithmetic 754-2008, two numbers are reserved for plus and minus infinity with an exponent of all 1s and a fraction of all 0s. The sign bit distinguishes between "−infinity" and "+infinity." However, these two numbers are defined herein as valid real numbers in the normalized range and have the finite value of $\pm 2^{\hat{}}(2^{\hat{}}N_{e-b-1})$. This leads to simplified operations for these numbers in a DSP or HAC micro-architecture.

NaNs are defined in the IEEE Standard for Floating-Point Arithmetic 754-2008 with a wide range of reserved data. The numbers with exponent all ones and mantissa range from 0x00 to 0xFFxxF are reserved in the IEEE Standard for NaNs. However, this format substantially reduces the dynamic range, especially for a short word length floating-point format (half-precision floating point, etc). NaNs are not needed for real signal amplitudes encountered in signal processing, and they are generally not defined in fixed-point arithmetic.

Thus, a hybrid floating-point/fixed-point number format is introduced herein so that all numbers with valid bit representation are valid real numbers with only few exceptions. These include both the number ranges reserved for positive and negative "SNaN" (smallest magnitude not-a-number) and "QNaN" (largest magnitude not-a-number) as shown below in Table 1, New Hybrid Format for Representation of Floating Point Numbers.

The number ranges with exponent bits all 0s (i.e., the minimum value for the exponent) and mantissa fraction bits not all 0s are reserved for "denormalized" real numbers in IEEE Standard for Floating-Point Arithmetic 754-2008. This arrangement requires complex hardware to process recycling of denormalized numbers as normalized real numbers. However, these numbers are usually not necessary for wireless signal processing and other computing arrangements. Especially when the power consumption of the chip becomes a major concern, the demand to simplify the micro-architecture becomes highly desirable.

As such, numbers in a denormalized range are recycled, as introduced herein, as normalized real numbers to reflect real signal amplitudes in signal processing. Thus, values for NaNs and subnormals, i.e., numbers that are not zero but are less in magnitude than a value that can be represented by the minimum exponent and a mantissa that starts with a (hidden) "1" bit, are not defined. This is suitable for baseband processing by taking a physical meaning of the wireless signals into account.

A maximum absolute value ("MaxAbs" in Table 1 and Table 2 below) is defined as the real number with the maximum amplitude. The number position is all 1s for both exponent and fraction bits, while the sign bit denotes either +MaxAbs or −MaxAbs.

The minimum absolute value ("MinAbs") is defined as the real number with minimum amplitude. The number position is all 0s in the exponent bits and only the LSB in the mantissa is 1. It has the format of x000000, . . . , 0001. The sign bit denotes either "+MinAbs" or "−MinAbs."

The hybrid floating-point number format introduced herein has several benefits. There is no number hole for "zero" in the representable range. All positions are utilized to represent real numbers. This feature retains a property of a fixed-point number format for representing real signals.

The handling of normalized real numbers is much simpler than denormalized numbers and other exceptions such as infinity and NaNs. Further details are described later hereinbelow.

TABLE 1

New Hybrid Format for Representation of Floating Point Numbers

Float Values (b = bias)

| Sign | Exponent (e) | Fraction (f: denoted by b1b2 . . . bNm) | Value | hybrid floating-point format Value |
|---|---|---|---|---|
| 0 | 00 . . . 00 | 00 . . . 00 | +0 | +0 |
| 0 | 00 . . . 00 | 00 . . . 01 . . 11 . . . 11 | Positive Denormalized Real $0.f \times 2(-b + 1)$ | Positive Normal Real Number $(1 + \Sigma_{m-1}^{Nm} b_m 2^{-m}) \times 2^{-b} +$ MinAbs = 0, 00 . . . 00, 00 . . . 01 |
| 0 | 00 . . . 01 . . 11 . . . 10 | XX . . . XX | Positive Normalized Real $1.f \times 2(e - b)$ | Positive Normalized Real $(1 + \Sigma_{m-1}^{Nm} b_m 2^{-m}) \times 2^{(e-b)}$ |

TABLE 1-continued

New Hybrid Format for Representation of Floating Point Numbers

Float Values (b = bias)

| Sign | Exponent (e) | Fraction (f: denoted by b1b2 ... bNm) | Value | hybrid floating-point format Value |
|---|---|---|---|---|
| 0 | 11 ... 11 | 00 ... 00 | +Infinity | Positive Normal Real $2^{(2^{N_e-b-1})}$ Continued Number Representation in Real number line. |
| 0 | 11 ... 11 | 00 ... 01 . . 01 ... 11 | SNaN | Positive Normalized Real $\left(1 + \sum_{m=2}^{N_m} b_m \times 2^{-m}\right) 2^{(2^{N_e-b-1})}$ b1 = 0. Continued Number Representation in Real number line. |
| 0 | 11 ... 11 | 10 ... 00 . . 11 ... 11 | QNaN | Positive Normalized Real $\left(1.5 + \sum_{m=2}^{N_m} b_m \times 2^{-m}\right) 2^{(2^{N_e-b-1})}$ Continued Number Representation in Real number line. +MaxAbs = 0, 11 ... 11, 11 ... 11. |
| 1 | 00 ... 00 | 00 ... 00 | −0 | −0 |
| 1 | 00 ... 00 | 00 ... 01 . . 11 ... 11 | Negative Denormalized Real −0.f × 2(−b + 1) | Negative Normalized Real $-(1 + \Sigma_{m=1}^{Nm} b_m 2^{-m}) \times 2 - b$ Continued Number Representation in Real number line. −MinAbs = 1, 00 ... 00, 00 ... 01 |
| 1 | 00 ... 01 . . 11 ... 10 | XX ... XX | Negative Normalized Real −1.f × 2(e − b) | Negative Normalized Real −1.f × 2(e − b) Continued Number Representation in Real number line. |
| 1 | 11 ... 11 | 00 ... 00 | −Infinity | Negative Normalized Real $-1 \times 2^{(N_e-b-1)}$ Continued Number Representation in Real number line. |
| 1 | 11 ... 11 | 00 ... 01 . . 01 ... 11 | SNaN | Negative Normalized Real $-\left(1 + \sum_{m=2}^{N_m} b_m \times 2^{-m}\right) 2^{(2^{N_e-b-1})}$ b1 = 0. Continued Number Representation in Real number line. |
| 1 | 11 ... 11 | 10 ... 00 . . 11.11 | QNaN | Negative Normalized Real $-\left(1.5 + \sum_{m=2}^{N_m} b_m \times 2^{-m}\right) 2^{(2^{N_e-b-1})}$ Continued Number Representation in Real number line. −MaxAbs = 1, 11 ... 11, 11 ... 11. |

Unlike the IEEE Standard for Floating-Point Arithmetic 754-2008, which defines only a multiple of a single-precision format, a configurable variable length floating-point format is introduced, wherein the bit width of each format can be selected by a software instruction according to a need of a signal characteristic. Some selected formats are listed as examples here:

"FP16" (a half-precision hybrid floating-point ("HFP") format) is a binary floating-point numbering format that occupies 2 bytes (16 bits). The FP16 format includes one sign bit, 5 exponent bits, and 11 bits of significand/mantissa precision. Ten bits are explicitly stored, and a hidden leading bit "1" is assumed to precede the 10 bits. Bias can be chosen as even (16) or odd (15). Bias16 is chosen for better symmetry in the 1/x reciprocal operation, while bias15 gives a higher range for large numbers. The choice of bias depends on the need of a particular application.

"FP28" (a full-precision floating-point hybrid format) is a 28-bit floating point format with one sign bit, 7 exponent bits, and 20 mantissa bits). Again, the bias can be chosen as even (64) or odd (63) according to the need of a particular application. This allows better micro-architecture design and allows sharing hardware resources from the 10-bit mantissa arithmetic unit to do the 20-bit mantissa in the arithmetic unit. In particular, a portion of logic to perform numerical operations on a 20-bit mantissa is reused in an embodiment to perform numerical operations on a 10-bit mantissa.

"FP8" (a half-precision floating-point format) is an 8-bit hybrid floating point format wherein the bit width in each domain is configured according to a signal dynamic range. When the number of exponent bits is reduced to 0, the FP8 format reduces to a traditional fixed-point format.

Operations on special numbers such as infinity are defined by IEEE Standard for Floating-Point Arithmetic 754-2008. In the simplest case, any operation with a NaN yields a NaN result. Table 2 below illustrates special numerical operations. For comparison, operations in the hybrid floating-point format introduced herein in the same range of numbers are illustrated in Table 2 below in the right column.

TABLE 2

Hybrid Floating-Point Format

| Operation | IEEE 754 | hybrid floating-point format |
|---|---|---|
| n ÷ ±Infinity | 0 | This is a normal multiply reciprocal operation n * 1/x as the x denotes the normal real numbers reserved by Infinity. It gives the value n * $2^{-(2^{N_e-b-1})}$ |
| ±Infinity × ±Infinity | ±Infinity | $\pm 2^{2*(2^{N_e-b-1})}$ overflows to ±MaxAbs. |
| ±nonzero ÷ 0 | ±Infinity | Divide-by-zero overflows to ±MaxAbs. |
| Infinity + Infinity | Infinity | $2^{(2^{N_e-b})}$ overflows to +MaxAbs. |
| ±0 ÷ ±0 | NaN | 1/(+−0) leads to overflow protection of +−MaxAbs. Then +−0 * MaxAbs leads to +−0. Final Result is +−0. |
| Infinity − Infinity | NaN | +0 |
| ±Infinity ÷ ±Infinity | NaN | ±1 as $2^{-(2^{N_e-b-1})}$ is a valid real number |
| ±Infinity × 0 | NaN | ±0 as $2^{-(2^{N_e-b-1})}$ is a valid number |
| Overflow | ±Inf | Simple clipping to +−MaxAbs |
| Underflow | Denormalization | Flush to zero or flush to MinAbs |
| Rounding | Round to zero, Round to even, Round to Inf. | No rounding and sticky bits in add architecture |
| Arithmetic Micro-architecture | Full | Simplified 2's complement bit operation |

Since zero is reserved as a special number, special handling of zero is employed. A set of rules for handling of zeros is defined and listed below to simplify arithmetic operations in the micro-architecture.

Addition of a number with 0s:
1) If a≠−0, a+(±0)=(±0)+a=a
2) −0+(−0)=−0
3) Commutative law and associative law for (+0,−0):
If there is at least one +0/−0 in a or b, a+b=b+a;
If there is at least one +0/−0 in a, b, c, then (a+b)+c=a+(b+c).
4) There is no requirement for a commutative law and an associative law for operations not involved with +0/−0. This could lead to (a+b)!=(b+a) in bit-level, or (a+b)+c!=a+(b+c). This level of computational error is admissible for a noisy signal processing environment such as wireless or wired communication system with noisy channels.

Deductions:
1) It would lead to +0 when there is one +0 for an arbitrary number ±0 add.
2) Adds of an arbitrary number of −0s generates −0.

Multiply with 0s:
1) If a is positive, then a×(+0)=(+0)×a=+0 and a×(−0)=(−0)×a=−0.
2) If a is negative, then a×(+0)=(+0)×a=−0 and a×(−0)=(−0)×a=+0.

Commutative law and associative law for multiply with +0/−0:
1) If there is at least one +0,−0 in a, b, then a×b=b×a
2) If there is at least one +0,−0 in a, b, c, then (a×b)×c=a×(b×c)
3) There is no requirement for a commutative law and an associative law for multiply operations not involving with +0/−0.

Comparisons:
1) Positive normal >+0 is the same as −0>negative normal
2) max(+0,−0)=+0
3) min(+0,−0)=−0

Reciprocals:
1) In FP16: 1/(+0)=216×(2−2−10) and 1/(−0)=−216×(2−2−10).
2) In FP28: 1/(+0)=264×(2−2−20) and 1/(−0)=−264×(2−2−20).

Underflow
1) A positive real number underflow will flush to +0, and a negative real number underflow will flush to −0.

Figure 3:
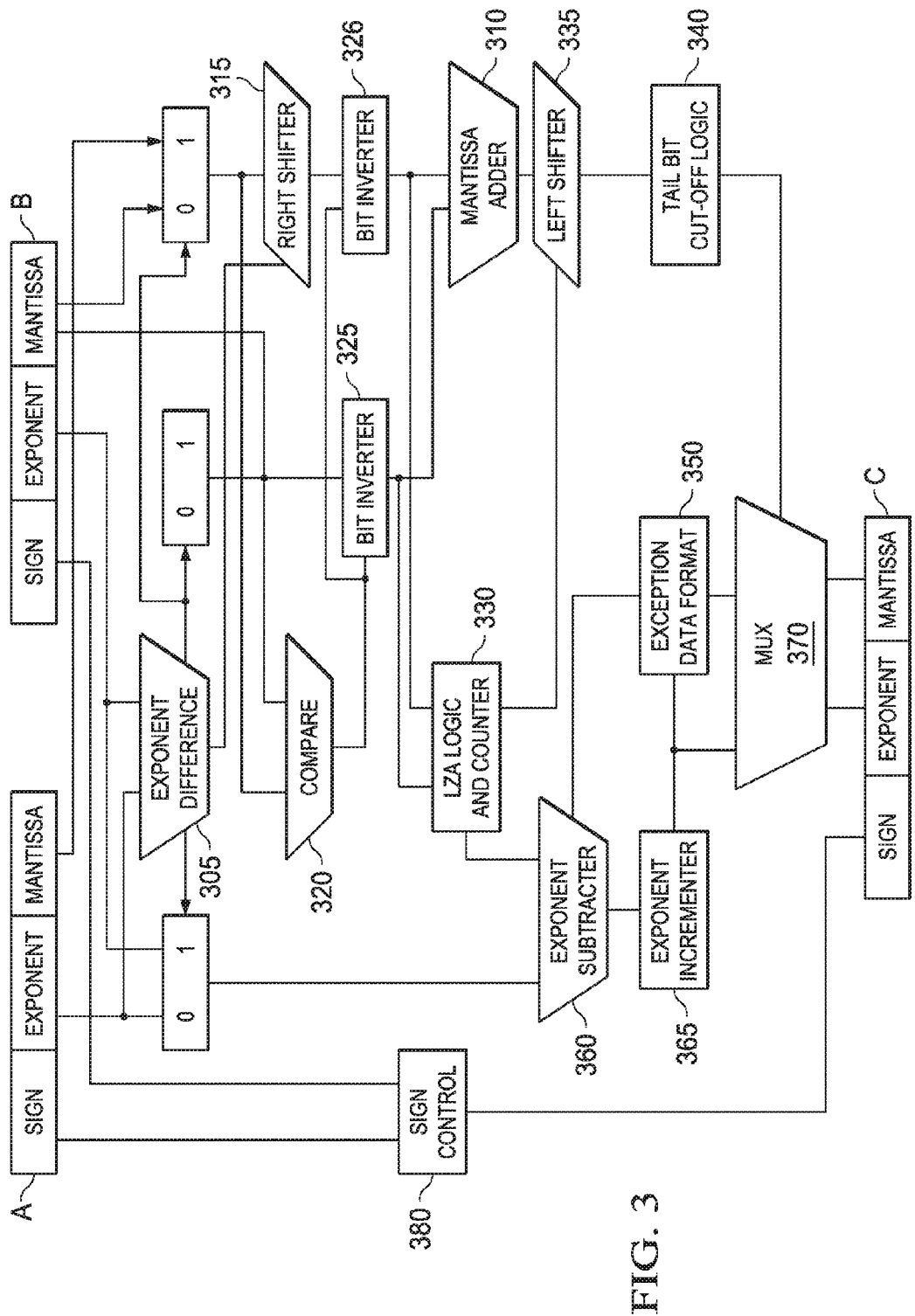
FIG. 3 illustrates a hybrid floating-point adder, in accordance with an embodiment.

Turning now to FIG. 3, illustrated is a hybrid floating point adder that cuts off excess tail bits, in accordance with an embodiment. Cutting off excess tail bits increases timing performance of the floating point adder. In the hybrid floating point adder illustrated in FIG. 3, the following components are included to add input data formed with a sign, exponent, and mantissa "A" and another input data formed with a sign, exponent, and mantissa "B":
1) an exponent difference calculator block 305 to calculate the difference of exponents of two operands;
2) a right shifter block 315 to align the exponent of the number with the smaller exponent;
3) a compare block 320 to compare the two significands;
4) two bit inverters, 325, 326;
5) a full integer adder 310;
6) leading zero anticipation logic and counter 330 and a left shifter 335;
7) tail bit cut-off logic 340 including an incrementer and compensation shifter for normalization logic to avoid the need for rounding control;

8) an exception data format block 350;
9) an exponent subtracter 360 and incrementer 365;
10) a multiplexer 370 that processes the data produced by exponent increment or 365, exception data format block 350 and tail bit cut-off logic 340 to produce an exponent and mantissa result with a sign bit, labeled "C"; and
11) a sign control block 380 to set the sign of the final result "C".

The cutting off of excess tail bits, control logic, and associated logic are configured to streamline the data path. There is no necessity for rounding bits and sticky bits, such as bits used for flags. As a result, the data path bit width for the multiplexer, adder, and shifters is reduced, shortening the critical path.

The hybrid floating-point adder illustrated in FIG. 3 adds a first input A formed with a sign bit, exponent bits, and mantissa bits, and a second input B formed with a sign bit, exponent bits, and mantissa bits, to produce a summed output C. The exponent difference between the first input A and the second input B is compared in the exponent difference block to choose the input with the larger exponent. The mantissas are then aligned in the right shifter block according to the exponent difference. The mantissa of the input with smaller exponent is shifted right to align with the mantissa of the input with the larger exponent. The blocks coupled to the output of the exponent difference block with the "0" and "1" are multiplexer blocks that choose the mantissa with the larger exponent. The bits of the aligned mantissas are then inverted in the bit inverter blocks to form twos complement representations, which are then added in the adder block, which is an integer adder, and which can inherently perform subtraction of the twos-complement inputs. The LZA ("leading zero anticipation") logic and counter block, in conjunction with the left shifter block, anticipates and corrects the number of leading zeros of the result to properly set the radix point after the addition/subtraction performed by the adder. Rounding control is applied to the shifted output of the adder. Ordinarily, the adder contains a large number of bits to accommodate a difference in exponents of the input data. To simplify the logic and reduce the number of bits that are processed, the excess tail bits (low-order bits) associated with the input with the smaller exponent are cut off in the rounding and tail bit management logic block. The excess tail bits are just cut off without rounding. The number of tail bits that are cut off is determined by a performance requirement of the application.

Figure 4:
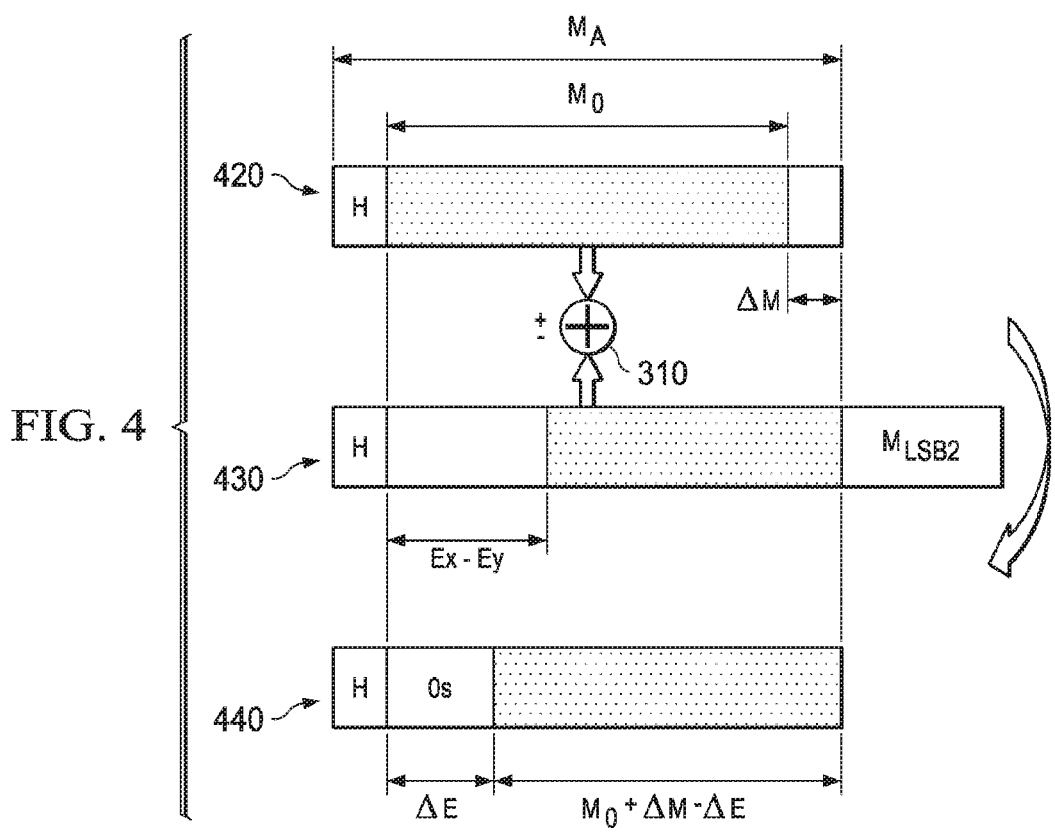
FIG. 4 illustrates a graphical representation of subtraction of bits in the mantissa adder illustrated in FIG. 3, in accordance with an embodiment.

Referring now to FIG. 4, illustrated is a graphical representation of arithmetic subtraction of bits in the mantissa adder 310 illustrated in FIG. 3. The bit width of the mantissa adder 310 is $M_A$ bits. A first input mantissa word, 420, includes $M_O$ mantissa bits preceded by a hidden "1" bit H. The bit width $M_A$ of the mantissa adder 310 can accommodate $\Delta M$ additional LSB bits of the first input mantissa word, 420. A second input mantissa word, 430, also includes $M_O$ mantissa bits preceded by a hidden "1" bit H. The mantissa bits of the second input mantissa word are aligned with the bits of the first input mantissa word according to an exponent difference Ex−Ey of their respective exponents (the exponent of the first input mantissa word minus the exponent of the second input mantissa word). The $\Delta E - \Delta M$ least significant bits $M_{LSB2}$ of the $M_O$ mantissa bits of the second input word are cut off to accommodate the bit width $M_A$ of the mantissa adder. The resulting mantissa word 440 of the subtraction includes a hidden "1" bit H followed by $\Delta E$ leading 0s, followed in turn by $M_O + \Delta M - \Delta E$ mantissa bits.

Figure 5:
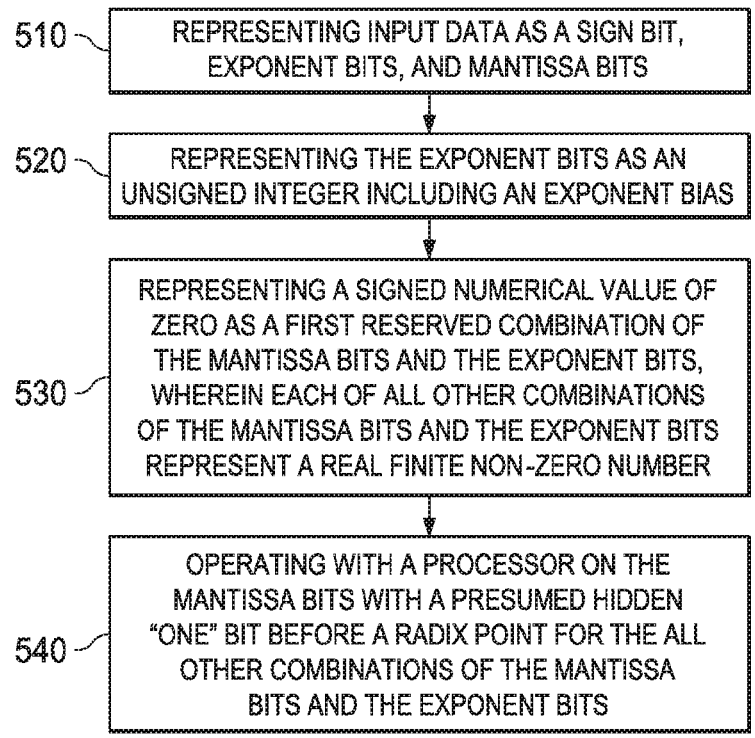
FIG. 5 illustrates a flowchart showing a process to perform a numerical operation on input data in a hybrid floating-point format, in accordance with an embodiment.

Referring now to FIG. 5, illustrated is a flowchart showing a process to perform a numerical operation on input data in a hybrid floating-point format, in accordance with an embodiment. In block or step 510 input data is represented as a sign bit, exponent bits, and mantissa bits. In block or step 520, the exponent bits are represented as an unsigned integer including an exponent bias. In block or step 530, a signed numerical value of zero is represented as a first reserved combination of the mantissa bits and the exponent bits, wherein each of all other combinations of the mantissa bits and the exponent bits represent a real finite non-zero number. In block or step 540, the mantissa bits are operated on with a processor with a presumed hidden "one" bit before a radix point for the all other combinations of the mantissa bits and the exponent bits.

Figure 6:
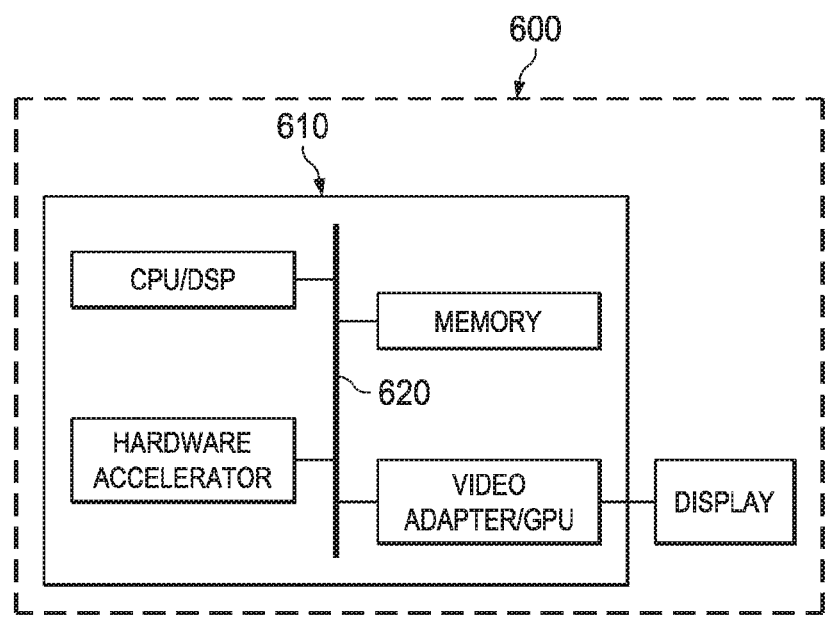
FIG. 6 illustrates a block diagram of elements of a processing system that may be used to perform one or more of the processes discussed hereinabove, in accordance with an embodiment.

Referring now to FIG. 6, illustrated is a block diagram of elements of a processing system 600 that may be used to perform one or more of the processes discussed hereinabove, in accordance with an embodiment. The processing system 600 may include a processor 610 equipped with one or more input/output devices, such as a video adapter/graphics processing unit ("GPU"). The processor 610 may include a central processing unit ("CPU")/DSP, memory, and a hardware accelerator connected to a bus 620.

The bus 620 may be one or more of any type of several bus architectures including a memory bus or memory controller, a peripheral bus, video bus, or the like. The CPU may be formed with any type of electronic data processor. The memory may be formed with any type of system memory such as static random access memory (SRAM), dynamic random access memory (DRAM), synchronous DRAM (SDRAM), read-only memory (ROM), nonvolatile random access memory ("NVRAM"), a combination thereof, or the like. In an embodiment, the memory may include ROM for use at boot-up, and DRAM for data storage for use while executing programs.

The video adapter/GPU provides an interface to couple an external input and output from a display to the processor. Other devices may be coupled to the processor, and additional or fewer interface cards may be utilized. For example, a serial interface card (not shown) may be used to provide a serial interface for a printer.

The processor may also include a network interface (not shown), which can be a wired link, such as an Ethernet cable or the like, and/or a wireless link to enable communication with a network such as a cellular communication network. The network interface allows the processor to communicate with remote units via the network. In an embodiment, the processor is coupled to a local-area network or a wide-area network to provide communications to remote devices, such as other processors, the Internet, remote storage facilities, or the like.

It should be noted that the processing system may include other components. For example, the processing system may include power supplies, cables, a motherboard, removable storage media, cases, and the like. These other components, although not shown, are considered part of the processing system.

Figure 7A:
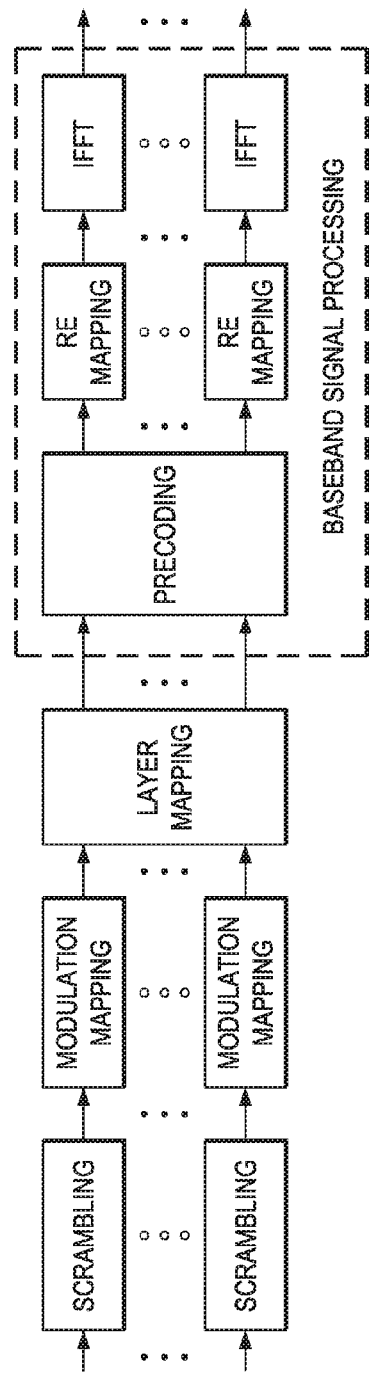
FIGS. 7a and 7b illustrate a block diagram of baseband signaling process of a communication system in accordance with an embodiment.
Figure 7B:
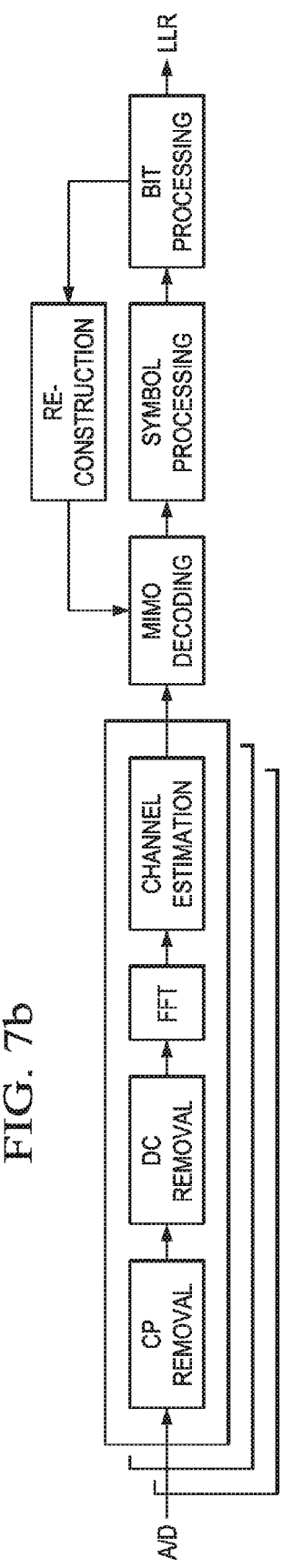

Referring to FIGS. 7a and 7b, typical implementation of the baseband signal processing in the downlink transmission at base stations and in the receiver path of LTE system are respectively illustrated.

Employing a hybrid floating-point process as introduced herein provides speed and cost improvements for a binary computing platform such as a DSP or a HAC. The variable length floating-point format achieves improved tradeoff between performance and complexity. It can be used for a floating-point hardware accelerator when local fine-grained word length characterization is needed. It reduces memory storage in comparison to a traditional fixed-point format by supporting a higher dynamic range with the same number of bits. This occurs because a fixed-point places a radix point somewhere in the middle of the bits, and is equivalent to using integers that represent portions of some unit. A fixed-point has a fixed window of representation, which limits it from representing very large or very small numbers. A fixed-point format is also prone to a loss of precision when two large numbers are divided. A floating-point format, on the other hand, employs a "sliding window" of precision appropriate to the scale of the number. The hybrid floating-point format requires significantly less porting effort in implementing a base-band algorithm in a floating point DSP processor than a fixed-point processor. The result is substantial benefits for a wireless baseband digital signal processor or a system on chip ("SOC") for base stations and terminal devices.

It is noted that, unless indicated otherwise, functions described herein can be performed in either hardware or software, or some combination thereof, with or without human intervention. In an embodiment, the functions are performed by a processor such as a computer or an electronic data processor, such as that discussed hereinabove with reference to FIG. 4, in accordance with code such as computer program code, software, and/or integrated circuits that are coded to perform such functions, unless indicated otherwise.

Embodiments such as those presented herein provide an apparatus and a related method to perform a numerical operation on input data in a hybrid floating-point format. The apparatus is formed with a memory and a processor coupled to the memory. Input data comprise a sign bit, exponent bits, and mantissa bits. The exponent bits comprise an unsigned integer including an exponent bias. A representation of a signed numerical value of zero comprises a first reserved combination of the mantissa bits and the exponent bits, wherein each of all other combinations of the mantissa bits and the exponent bits represent a real finite non-zero number, and wherein the mantissa bits are preceded by a hidden "one" bit before a radix point for the all other combinations of the mantissa bits and the exponent bits.

In an embodiment, the first reserved combination of the mantissa bits and the exponent bits comprises all the mantissa bits and all the exponent bits set to zero, and the apparatus is configured to set the mantissa bits and the exponent bits to a maximum finite value when the exponent bits produced by the numerical operation are computed to be greater than all the exponent bits set to one.

In an embodiment, the apparatus is selectively configured in a first configuration to set the mantissa bits and the exponent bits to a second reserved combination of the mantissa bits and the exponent bits when an absolute value of a result produced by the numerical operation is less than a minimum absolute value among those represented by the all other combinations of the mantissa bits and the exponent bits, and in a second configuration to set the mantissa bits and the exponent bits to the minimum absolute value when the absolute value of the result produced by the numerical operation is less than the minimum absolute value. In an embodiment, the first configuration and the second configuration are selected by a flag. In an embodiment, the first reserved combination of the mantissa bits and the exponent bits and the second reserved combination of the mantissa bits and the exponent bits are equal.

In an embodiment, the apparatus is configured to set all the mantissa bits and all the exponent bits to the first reserved combination of the mantissa bits and the exponent bits when the numerical operation produces all zeros for the exponent bits and a hidden zero bit before the radix point.

In an embodiment, a bit length of the hybrid floating-point format is configurable by an operational instruction. In an embodiment, the bit length comprises a 16-bit floating-point format. In an embodiment, the exponent bias is an even number.

In an embodiment, the apparatus further comprises tail bit cut-off logic to cut off excess tail bits in a floating-point adder therein.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus comprising:
a non-transitory memory; and
a processor coupled to the memory, the processor configured to:
receive a multiple-input multiple output (MIMO) wireless baseband signal comprising input data having a sign bit, exponent bits, and mantissa bits, the processor comprising a hardware floating-point unit configured to perform a numerical operation on the input data in a 16-bit half-precision floating-point format; and
use a result of the numerical operation performed by the hardware floating-point unit in processing the MIMO wireless baseband signal,
wherein the exponent bits comprise an unsigned integer with an implied bias,
wherein a representation of a signed numerical value of zero comprises a first reserved combination of the mantissa bits and the exponent bits, and
wherein the mantissa bits are preceded by a bit "1" before a radix point for all other combinations of the mantissa bits and the exponent bits.

2. The apparatus of claim 1, wherein the implied bias is 16, providing symmetry in a 1/x reciprocal operation.

3. The apparatus of claim 1, wherein each of the all other combinations of the mantissa bits and the exponent bits represents a real finite non-zero number.

4. The apparatus of claim 1, wherein the hardware floating-point unit comprises dedicated tail bit cut-off-only logic to cut off excess tail bits of an intermediate mantissa result without rounding the intermediate mantissa result.

5. The apparatus of claim 1, wherein the bit "1" before the radix point for the all other combinations of the mantissa bits and the exponent bits is hidden.

6. The apparatus of claim 1, wherein the hardware floating-point unit is further configured to produce from the numerical operation the result as always either zero or a real finite non-zero number.

7. The apparatus of claim 1, wherein the hardware floating-point unit is further configured to set the mantissa bits and the exponent bits to a maximum finite value when the exponent bits produced by the numerical operation are computed to be greater than all the exponent bits set to one.

8. An apparatus comprising:
a non-transitory memory; and
a processor coupled to the memory, the processor configured to:
receive a multiple-input multiple output (MIMO) wireless baseband signal comprising input data having a sign bit, exponent bits, and 20 mantissa bits, the processor comprising a hardware floating-point unit configured to perform a numerical operation on the input data in a 28-bit full-precision floating-point format; and
use a result of the numerical operation performed by the hardware floating-point unit in processing the MIMO wireless baseband signal,
wherein the exponent bits comprise an unsigned integer with an implied bias,
wherein a representation of a signed numerical value of zero comprises a first reserved combination of the mantissa bits and the exponent bits, and
wherein the mantissa bits are preceded by a bit "1" before a radix point for all other combinations of the mantissa bits and the exponent bits.

9. The apparatus of claim 8, wherein the implied bias is 64, providing symmetry in a 1/x reciprocal operation.

10. The apparatus of claim 8, wherein each of the all other combinations of the mantissa bits and the exponent bits represents a real finite non-zero number.

11. The apparatus of claim 8, wherein the hardware floating-point unit comprises dedicated tail bit cut-off-only logic to cut off excess tail bits of an intermediate mantissa result without rounding the intermediate mantissa result.

12. The apparatus of claim 8, wherein the bit "1" before the radix point for the all other combinations of the mantissa bits and the exponent bits is hidden.

13. The apparatus of claim 8, wherein the hardware floating-point unit is further configured to produce from the numerical operation the result as always either zero or a real finite non-zero number.

14. The apparatus of claim 8, wherein the hardware floating-point unit is further configured to set the mantissa bits and the exponent bits to a maximum finite value when the exponent bits produced by the numerical operation are computed to be greater than all the exponent bits set to one.

15. A method of performing a numerical operation on input data in a 16-bit half-precision floating-point format, the method comprising:
receiving a multiple-input multiple output (MIMO) wireless baseband signal comprising input data having a sign bit, exponent bits, and mantissa bits;
representing, by a hardware floating-point unit in accordance with the 16-bit half-precision floating-point format, the exponent bits as an unsigned integer with an implied bias;
representing, by the hardware floating-point unit, a signed numerical value of zero as a first reserved combination of the mantissa bits and the exponent bits;
numerically operating, by the hardware floating-point unit, on the mantissa bits with a bit "1" before a radix point for all other combinations of the mantissa bits and the exponent bits to produce a result, the numerical operation comprising a multiplication or a division operation; and
using the result in processing the MIMO wireless baseband signal.

16. The method of claim 15, wherein the implied bias is 16, providing symmetry in a 1/x reciprocal operation.

17. The method of claim 15, wherein each of the all other combinations of the mantissa bits and the exponent bits represents a real finite non-zero number.

18. The method of claim 15 further comprising, prior to producing the result, cutting off excess tail bits of an intermediate mantissa result, without rounding the intermediate mantissa result, in the hardware floating-point unit with dedicated tail bit cut-off-only logic.

19. The method of claim 15, wherein the bit "1" before the radix point for the all other combinations of the mantissa bits and the exponent bits is hidden.

20. The method of claim 15, further comprising producing, by the hardware floating-point unit from the numerical operation, the result as always either zero or a real finite non-zero number.

21. The method of claim 15, further comprising:
computing that the exponent bits produced by the numerical operation are greater than all the exponent bits set to one; and
setting, in response to the computing, the mantissa bits and the exponent bits to a maximum finite value.

22. A method of performing a numerical operation on input data in a 28-bit half-precision floating-point format, the method comprising:
receiving a multiple-input multiple output (MIMO) wireless baseband signal comprising input data having a sign bit, exponent bits, and 20 mantissa bits;
representing, by a hardware floating-point unit in accordance with the 28-bit half-precision floating-point format, the exponent bits as an unsigned integer with an implied bias;
representing, by the hardware floating-point unit, a signed numerical value of zero as a first reserved combination of the mantissa bits and the exponent bits;
numerically operating, by the hardware floating-point unit, on the mantissa bits with a bit "1" before a radix point for all other combinations of the mantissa bits and the exponent bits to produce a result, the numerical operation comprising a multiplication or a division operation; and
using the result in processing the MIMO wireless baseband signal.

23. The method of claim 22, wherein the implied bias is 16, providing symmetry in a 1/x reciprocal operation.

24. The method of claim 22, wherein each of the all other combinations of the mantissa bits and the exponent bits represents a real finite non-zero number.

25. The method of claim 22 further comprising, prior to producing the result, cutting off excess tail bits of an intermediate mantissa result, without rounding the intermediate mantissa result, in the hardware floating-point unit with dedicated tail bit cut-off-only logic.

26. The method of claim 22, wherein the bit "1" before the radix point for the all other combinations of the mantissa bits and the exponent bits is hidden.

27. The method of claim 22, further comprising producing, by the hardware floating-point unit from the numerical operation, the result as always either zero or a real finite non-zero number.

28. The method of claim 22, further comprising:
computing that the exponent bits produced by the numerical operation are greater than all the exponent bits set to one; and
setting, in response to the computing, the mantissa bits and the exponent bits to a maximum finite value.

* * * * *